United States Patent

[11] 3,613,024

[72] Inventors Joseph E. Geusic
Berkeley Heights;
Michael A. Karr, III, Murray Hill, both of N.J.
[21] Appl. No. 805,202
[22] Filed Mar. 7, 1969
[45] Patented Oct. 12, 1971
[73] Assignee Bell Telephone Laboratories, Incorporated
Murray Hill, N.J.

[54] CONTINUOUSLY PUMPED Q-SWITCHED ARRANGEMENT INCLUDING AN ND:YAIG LASER ELEMENT
1 Claim, 2 Drawing Figs.

[52] U.S. Cl. .................................................. 331/94.5,
350/160
[51] Int. Cl. .................................................. H01s 3/11
[50] Field of Search .................................... 331/94.5;
350/160, 161

[56] References Cited
UNITED STATES PATENTS
3,297,876  1/1967  DeMaria .................... 331/94.5

*Primary Examiner*—William L. Sikes
*Attorneys*—R. J. Guenther and Kenneth B. Hamlin

ABSTRACT: Q-switching of a laser is accomplished by controlling the state of an intracavity acousto-optic switch that comprises a piezoelectric transducer bonded to a low-optical-loss ultrasonic propagation medium. Energization of the transducer causes a traveling acoustic diffraction grating to propagate through the medium. Illustratively, the direction of propagation of the grating is perpendicular to the direction in which light travels in the laser. The interaction between the light and the acoustic grating gives rise to diffraction losses that prevent the laser from oscillating. In response to a momentary deenergization of the transducer, the laser cavity is restored to a high-Q oscillatory condition during which energy stored in the system during the nonoscillatory state is suddenly released. During each such deenergization period, a high-amplitude output pulse of coherent radiation is obtained.

INVENTORS: J. E. GEUSIC
M. A. KARR III
BY
Lucian C. Canepa
ATTORNEY

CONTINUOUSLY PUMPED Q-SWITCHED ARRANGEMENT INCLUDING AN ND:YAIG LASER ELEMENT

BACKGROUND OF THE INVENTION

1. Field of the Invention

This invention relates to signal translation and more particularly to a Q-switched laser arrangement.

2. Description of the Prior Art

In 1961 Hellwarth proposed the generation of very intense and short bursts of radiation from laser devices (see *Advances in Quantum Electronics*, ed. by J. R. Singer, Columbia University Press, 1961, pp. 334–341). His proposal was based on the sudden application of high regenerative feedback to an excited laser system. This technique, now called laser Q-switching, was subsequently described by McClung and Hellwarth as being achieved with a Kerr cell (*J. Appl. Phys.*, Vol. 33, pp. 828–829, March 1962), by Collins and Kisliuk with a rotating disc. (*J. Appl. Phys.*, Vol. 33, pp. 2009–2011, June 1962) and by DeMaria, Gagosz and Barnard with an ultrasonic-refraction shutter (*J. Appl. Phys.*, Vol. 34, pp. 453–456, March 1963). Rotating mirrors and prisms, Pockels cells and saturable absorbers have also been suggested for use in Q-switched laser arrangements (see P. P. Sorokin, J. J. Luzzi, J. R. Lankard and G. D. Pettit, *IBM J. Research and Develop.*, Vol. 8, pp. 182–194, Apr. 1964; P. Kafalas, J. I. Masters and E. M. E. Murray, *J. Appl. Phys.*, Vol. 35, pp. 2349–2350, Aug. 1964; and L. M. Frantz and J. S. Nodvik, *J. Appl. Phys.*, Vol. 34, pp. 2346–2349, Nov. 1963).

The neodymium-containing yttrium aluminum garnet (Nd:YaIG) laser developed by Geusic and Van Uitert (see U.S. Pat. No. 3,252,103, issued May 17, 1966) is an advantageous solid-state laser capable of continuous room-temperature operation. It has been demonstrated that this type of laser is capable of Q-switched operation. Specifically, repetitively Q-switched Nd:YAIG lasers have been operated using both rotating reflectors and electro-optic modulators (see J. E. Geusic, M. L. Hensel and R. G. Smith, *Appl. Phys. Lett.*, 6, pp. 175–177, May 1, 1965; and R. G. Smith and M. F. Galvin, *IEEE J. Quan. Elec.*, QE-3, pp. 406–414, Oct. 1967). However, both of these modulating techniques exhibit some practical disadvantages which stem from various mechanical problems inherent in rotating reflectors and the unavailability of suitable low-loss electro-optic crystals.

SUMMARY OF THE INVENTION

Accordingly, an object of the present invention is an improved laser arrangement.

More specifically, an object of this invention is an improved Q-switched laser arrangement of the Nd:YAIG type.

Another object of the present invention is a Q-switched Nd:YAIG laser arrangement well suited for use in various micromachining applications of practical interest.

A still further object of this invention is a Q-switched Nd:YAIG laser arrangement capable of generating high-repetition-rate high-peak-power pulses exhibiting an advantageous pulse-to-pulse amplitude stability.

Briefly stated, these and other objects of the present invention are realized in a specific illustrative embodiment thereof which comprises a continuously pumped Nd:YAIG laser arrangement that includes an intracavity acousto-optic modulator. The modulator comprises a piezoelectric transducer bonded to a low optical loss ultrasonic propagation medium.

The transducer is electrically driven to launch a traveling acoustic diffraction grating in the ultrasonic medium. Illustratively, the axis along which the optical beam of the arrangement is designed to travel is perpendicular to the direction in which acoustic waves are propagated in the medium. Sufficient electrical power is applied to the transducer to cause the diffraction losses per pass in the arrangement to exceed the characteristic gain per pass. Thus, during the time in which a traveling acoustic wave exists in the ultrasonic medium, no laser oscillations occur. During this time, energy is accumulated in the upper level of the laser transition of the Nd:YAIG system. Q-switching is accomplished by pulsing of the electrical signals applied to the transducer. This restores the laser to a high-Q oscillatory condition. During this restoration period, the stored energy of the system is suddenly released whereby a high-amplitude pulse of coherent radiation is obtained therefrom.

It is a feature of the present invention that a Q-switched laser arrangement include an ultrasonic propagation medium for propagating a traveling acoustic diffraction grating that introduces sufficient losses in the arrangement to prevent oscillations from occurring therein.

It is another feature of this invention that circuitry be provided to momentarily terminate the traveling grating thereby to restore the arrangement to a high-Q oscillatory condition and to induce a high-amplitude pulse to occur during the termination period.

BRIEF DESCRIPTION OF THE DRAWING

A complete understanding of the present invention and of the above objects, features and advantages thereof may be gained from a consideration of the following detailed description of a specific illustrative embodiment thereof presented herein below in connection with the accompanying drawing, in which.

DETAILED DESCRIPTION

Figure 1:
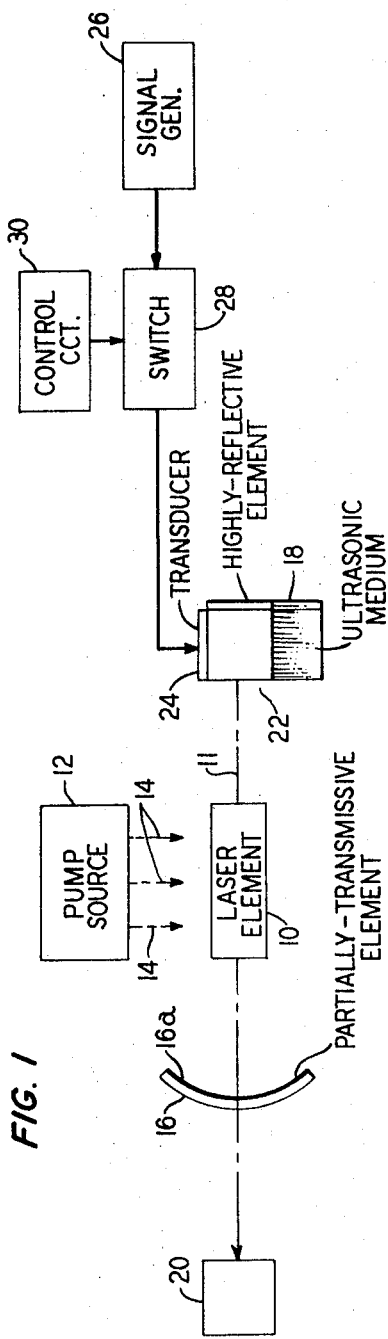
FIG. 1 depicts a specific illustrative embodiment made in accordance with the principles of the present invention.

The specific illustrative laser arrangement shown in FIG. 1 includes a conventional laser element 10 which may, for example, comprise a neodymium-containing yttrium aluminum garnet (Nd:YA1 G) rod of the type described in the aforecited Geusic-Van Uitert patent. Illustratively, the element 10 is a cylindrical rod whose main axis is coincident with the longitudinal axis 11 (dot-dash line) of the laser arrangement. Typically the ends of the laser element 10 are flat, parallel and coated to be antireflecting at a wavelength of 1.06 microns. Continuous pumping of the element 10 to achieve an output at 1.06 microns is achieved by means of a conventional pump source 12 whose radiant output, directed at the element 10, is represented by dashed arrows 14.

The laser element 10 of FIG. 1 is contained in a conventional cavity defined, for example, by a curved member 16 and a highly reflective element 18. The member 16 has a partially transmissive element 16a coated, deposited, adhered or otherwise suitably disposed on the concave surface thereof. Illustratively, the element 16a is selected to transmit to an output element 20 about 1.6 percent of the 1.06-micron radiation that impinges on the concave side of the composite 16–16a structure. The element 20 may, for example, comprise a work piece such as a thin-film resistor whose characteristics are to be precisely controlled by laser-micromachining techniques that involve selective material removal. For such purposes either the laser arrangement or the work piece or both may be moved by conventional micropositioning apparatus (not shown).

The element 18 shown in FIG. 1 comprises, for example, a conventional highly reflective coating which is designed to reflect approximately 99.95 percent of the 1.06-micron radiation incident on the left side thereof. Advantageously, the element 18 is coated on a supporting member 22 that comprises an ultrasonic-propagation medium which is selected, position, proportioned and driven in accordance with the principles of the present invention.

In accordance with this invention, the ultrasonic member 22 advantageously comprises a fused silica block. In its quiescent or undriven state such a block exhibits a low optical loss to 1.06-micron radiation propagated therethrough along the axis 11. Accordingly, if the member 22 is not activated, the depicted arrangement is well suited for conventional continuous-wave operation.

Activation of the ultrasonic member 22 in accordance with the principles of the present invention is achieved by means of a conventional piezoelectric transducer 24 which, for example, is bonded to the top surface of the member 22. The transducer 24 is driven by a radiofrequency sine-wave signal supplied by a generator 26. Whether or not the continuous output of the generator 26 is actually applied to the transducer 24 is determined by the state of a conventional switch 28 whose condition (open or closed) is in turn controlled by a conventional circuit 30.

Illustratively, the bottom surface of the ultrasonic member 22 is beveled to prevent the formation of acoustic standing waves. (In addition, it is advantageous to place a suitable energy-absorbing element in contact with the sides and bottom of the member 22. In particular, it has been determined that a fiber glass tape wrapping about the sides and bottom of the member 22 aids in preventing the formation of standing waves therein.) Accordingly, the generator 26 and the transducer 24 are effective, when the switch 28 is controlled by the circuit 30 to be in its closed or transmitting state, to launch a progressive or traveling acoustic wave in the member 22. By selecting the output frequency of the generator 26 such that several wavelengths of the traveling acoustic wave are encompassed within the width of the light beam generated in the depicted laser arrangement, the launched wave acts as a traveling acoustic-diffraction grating with respect to the beam. Illustratively, the grating is launched to travel in a direction perpendicular to the axis 11 along which the light beam is designed to propagate.

The interaction between the aforementioned light beam and the traveling acoustic grating gives rise to diffraction losses. (For a discussion of this type of interaction, see *Principles of Optics*, by M. Born and E. Wolf, Pergamon Press, N.Y. 1964, pp. 593-610.) By launching relatively large-amplitude acoustic waves in the ultrasonic member 22, sufficient spatial dispersion of the light beam occurs that the loss per pass due to diffraction in the laser cavity exceeds the characteristic gain per pass of the laser arrangement. In this way the member 22 is effective, when suitably activated, to prevent the occurrence of oscillations in the arrangement. During this nonoscillatory condition, no output signal is directed at the element 20. However, during this condition, the source 12 continues to pump the laser element 10 and, as a result, energy is accumulated in the upper level of the laser transition of the Nd:YA1G system.

Figure 2:
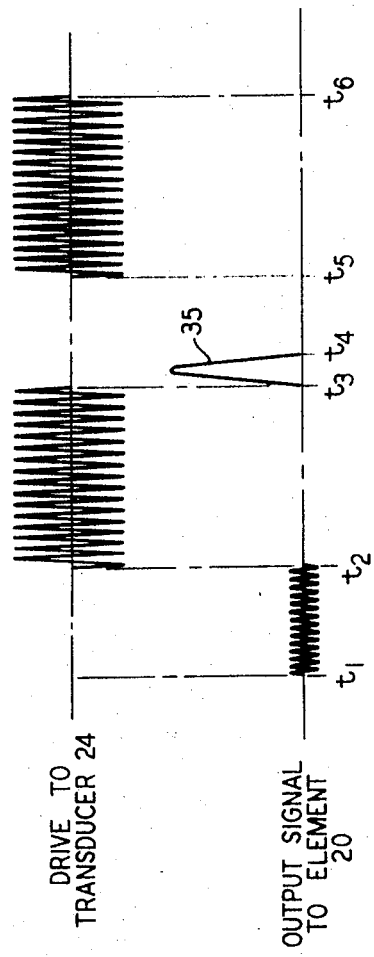
FIG. 2 depicts several waveforms that are helpful in understanding the mode of operation of the FIG. 1 arrangement.

The overall mode of operation of the FIG. 1 arrangement can be best understood by reference to the waveforms of FIG. 2. At time $t_1$ shown in FIG. 2, the signal generator 26 of FIG. 1 is assumed to commence to provide an output signal. Between times $t_1$ and $t_2$, the switch 28 is assumed to be in its blocking state, and hence no driving signals are applied to the transducer 24. During that interval, the depicted arrangement oscillates in its conventional continuous-wave manner and, as shown in FIG. 2, a relatively low-amplitude output signal is delivered to the element 20.

At time $t_2$ the circuit 30 controls the switch 28 to allow the output of the generator 26 to be applied to the transducer 24. Accordingly, at that time a traveling acoustic diffraction grating is launched in the ultrasonic member 22 and, as described above, the laser arrangement is thereby rendered nonoscillatory. The absence of an output signal from the arrangement during the interval $t_2$ through $t_3$ is represented in the bottom waveform of FIG. 2.

At time $t_3$ shown in FIG. 2, the circuit 30 of FIG. 1 opens the switch 28 thereby deactivating the transducer 24 and terminating the aforementioned traveling acoustic diffraction grating. In the absence of the aforementioned diffraction losses, the laser arrangement is returned to a high-Q oscillatory condition. During this condition, the aforementioned energy accumulated in the upper level of the laser transition is suddenly released. This sudden release causes a high-amplitude pulse 35 (FIG. 2) of coherent radiation to be directed at the output element 20.

After the high-amplitude output pulse 35 has terminated (at time $t_4$) and before the laser arrangement commences to oscillate in its continuous-wave mode of operation, the drive to the transducer 24 is resumed, at time $t_5$. In the interval $t_5$ through $t_6$ the aforementioned diffraction losses introduced by the ultrasonic member 22 are again effective to maintain the arrangement in its nonoscillatory condition.

In one specific illustrative Q-switched Nd:YA1G embodiment of the principles of the present invention, the generator 26 provided a 100-volt RMS signal at 40 MHz. The transducer 24 comprised a 0.0025 inch × 0.125 inch × 2.00 inch X-cut natural quartz element. This element was bonded to the top surface of an ultrasonic delay member 22 that comprised a 0.150 inch × 0.825 inch × 2.00 inch fused silica block whose bottom surface was beveled at 30° to prevent standing acoustic waves. (Advantageously, as indicated above, the sides and bottom of the member 22 may also be wrapped with fiberglass tape.) Q-switching of this particular embodiment with a pulse-to-pulse stability of better than 1 percent was achieved. Output pulses each having a peak power of approximately one kilowatt at 1.06 microns were obtained from the arrangement at repetition rates up to about 5,000 pulses per second. Higher repetition rates, up to about 50,000 pulses per second, were obtained at lower power levels. (By contrast the peak-power output during continuous-wave operation was about one watt.) In the Q-switched mode of operation the output pulse width (measured at the half-power point) was typically about 300 nanoseconds.

It is to be understood that the above-described arrangement is only illustrative of the application of the principles of the present invention. In accordance with these principles, numerous other arrangements may be devised by those skilled in the art without departing from the spirit and scope of the invention. For example, although specific emphasis herein has been directed to a Nd:YA1G lasser system, it is to be understood that other laser elements having transitions characterized by moderately long lifetimes are also suited for inclusion in embodiments of the present invention. Moreover, various known techniques in the laser art may advantageously be incorporated in embodiments of this invention. Thus, for example, by positioning a $Ba_2 NaNb_5 O_{15}$ crystal (described by J. E. Gevsic, H. J. Levinstein, J. J. Rubin, S. Singh and L. G. Van Uitert, *Appl. Phys. Lett.* 11, 269, 1967) in the cavity of a Q-switched Nd:YA1G laser, the normal 1.06-micron output thereof is converted to an output having a wavelength of 0.53 microns. It has been observed that this conversion in the Q-switched mode of operation can be achieved with smaller crystals than are required in continuous-wave operation.

In addition, it is emphasized that the particular materials specified herein for the transducer 24 and the ultrasonic propagation member 22 are intended to be illustrative only. Other transducer materials, such as, for example, lithium niobate, and other ultrasonic-propagation materials, such as, for example, lead molybdate, are well suited for inclusion in embodiments of this invention. Judicious selection of various combinations of available materials for the members 22 and 24 can result in substantially reducing the driving power needed to launch the required traveling acoustic-diffraction grating in the member 22.

For illustrative reasons the direction of propagation of the traveling acoustic-diffraction grating has been described above as being perpendicular to the direction in which the laser-generated light beam propagates. Alternatively, the arrangement may be structured such that the grating and beam are oriented at the Bragg angle with respect to each other. In this alternative arrangement the driving power required to launch the grating is reduced.

What is claimed is:

1. In combination in a Q-switched laser arrangement,
   oscillator means, including an Nd:YA1G laser element characterized by a transition having a moderately long lifetime, for generating a coherent beam of radiation and propagating said beam along a main axis of said arrangement, said oscillator means further including means of continuously pumping said laser element to achieve an output at 1.06 microns, a fused silica block interposed in the path of said beam for propagating a traveling acoustic-diffraction grating, said block including first and second opposed surfaces and being characterized by a low optical loss to 1.06-micron radiation propagated therethrough, one of said opposed surfaces of said block being beveled to prevent the formation in said block of acoustic standing waves, means coupled to the other one of said opposed surfaces of said block for driving said block to launch therein a traveling acoustic grating that causes sufficient diffraction losses in said arrangement to exceed the characteristic gain thereof thereby to maintain said oscillator means in a nonoscillatory condition during which energy is accumulated in the upper level of the laser transition of said Nd:YAlG laser element, and means connected to said driving means for momentarily interrupting the launching of said grating thereby to allow said oscillator means to assume a low-loss oscillatory condition during said interruption and to provide a high-amplitude output signal derived from the energy stored in the combination during said nonoscillatory condition.